T. J. Alexander,
Circular Sawing Machine,

№ 14,757. Patented Apr. 29, 1856.

UNITED STATES PATENT OFFICE.

THOMAS J. ALEXANDER, OF WESTERVILLE, OHIO.

SAWING-MACHINE.

Specification of Letters Patent No. 14,757, dated April 29, 1856.

*To all whom it may concern:*

Be it known that I, THOMAS J. ALEXANDER, of Westerville, in the county of Franklin and State of Ohio, have invented a certain new and useful Improvement in Sawing-Machines, of which the following is a full, clear, and exact description, reference being had to the accompanying drawing, which forms part of this specification, and in which—

Figure 1:
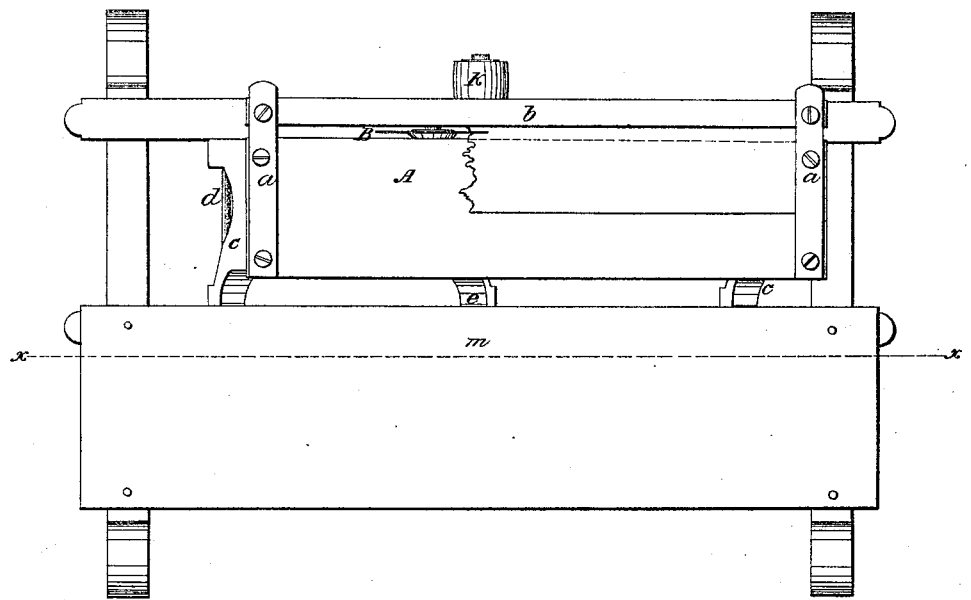
Figure 2:
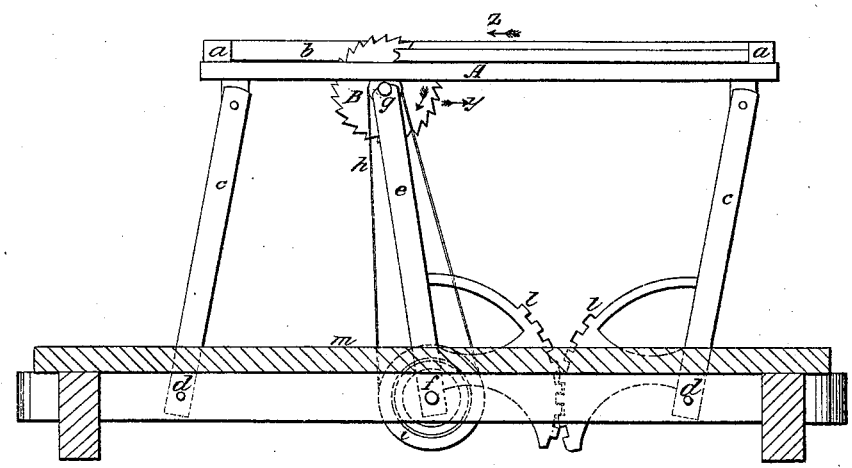

Figure 1 represents a plan or top view of the machine as constructed for operation in one position, and Fig. 2 a sectional front elevation of the same, the section being taken as indicated by the line $x$ $x$ in Fig. 1.

Saws it is well known have been variously hung and operated, both circular saws, straight and segmental ones, and others of a revolving or reciprocating character; they have been made to vibrate in the performance of their work and to move up, against or through the work: and, as is also well known, the work has been made automatically as it were to move up against the saw by various kinds of feed such as a log frame or carriage, or it has been run up against the saw by hand on or over a fixed bed or table. This latter is the usual mode adopted in the working of circular, oval or other revolving saw mills, and much valuable time is lost by it in consequence of the operator having constantly to shift his position in pushing, running or feeding up the board or work and in retracing his steps to commence another feed and much labor is consumed by the friction of the board or work in its passage on, along and over the bed, either in the one or both directions accordingly as the board is designed to be cut once by the saw or the cut repeated a number of times in succession as in the case of cutting up a piece of timber or board into strips for the manufacture of laths and so forth. In the manufacture of laths for instance, or other articles partaking of their configuration, it is customary first to divide the "slab" or board into what are called "bolts" for the greater convenience of the operator and for the reduction of friction and labor required to overcome the same as compared with the operation of a large and heavy "slab" in feeding up the board or work and drawing it back on the bed or table, for the continuous repetition of the cut to make the laths: much time is lost in thus operating, firstly in the cutting up of the "slab" into "bolts," in the requisite frequent renewal of bolts on the saw-bed or table especially where a large number of laths are required, and in the operator constantly changing his position in the running or feeding up and drawing back the bolt and where the feed is a long one the fatigue consequent on so doing is soon and greatly felt. For cutting up such, or other light, work, as compared with heavy log work, circular saws are usually employed, and in all circular saw arrangements it is desirable to avoid complicity and make them as simple to build or repair and easy to operate as possible, also cheap as to first cost and free from excessive friction and within the capacity, if desired, of moderate animal power to work, so that anti-friction rollers, automatic feeds and so forth are not common to such arrangements and the disadvantages so recently referred to of loss of time in the feed and so forth and consumption of labor are incidental to most or all of such arrangements. My improvement proposes to obviate the same in a very simple and effective manner.

In the machine represented in the accompanying drawing, the bed or table (A), made of any required length and breadth, is shown with a stop piece (*a*) at one or both ends and an adjustable or fixed gage strip (*b*) along the top on the rear side. This bed has pivoted or jointed to it at or near either end and is supported by radius pieces or legs (*c*) whose fulcra or trunnions are at fixed points (*d*) below, so that the bed thus hung may be swung or reciprocated in direction of its length without departure from the horizontal posture though its altitude varies, like and as is common to other "parallel movements." The saw (B) is similarly hung on or to a central or intermediate radius piece or arm (*e*) of like length, if the cut is required to be straight or incision of equal depth, to the radius legs (*c*) of the bed, and also hung on a fulcrum or trunnion at a fixed point (*f*) below, so that on giving a reciprocating motion to the saw and bed in opposite directions, the saw, through moving along the bed path in a sweep or curve by the swinging of the radius arm (*e*), preserves—that is its center or axis does—the same parallel position relatively to the bed by the swinging of the latter from like radii, as described, in the opposite direction, and in this manner or by this compound parallel movement a regular depth of cut is insured. The saw (B), besides having this motion, has the usual revolving one and which may be communicated to it by a pulley (g) on its shaft driven by band (h) from a pulley (i) whose shaft may form the fulcrum of the radius arm (e) of the saw and have a driving pulley (k) on the outside end of it to receive motion from any suitable power.

The specified, simultaneous, reciprocating action of the bed and saw may be obtained in a very simple manner by gearing by toothed segments (l l) the radius arm (e) of the saw and the one radius leg (c) of the bed, so that upon the operator standing on the platform or footboard (m), at or about its center say, and pressing the bed (A), by his hand, longitudinally so as to cause it to move in the one direction, the revolving saw (B) will be caused to reciproctae or move in the opposite direction, as indicated by the arrows (y, z, in Fig. 2), or vice versa. Thus a compound parallel movement of the bed and revolving saw is effected in a very simple manner, with but a trifling amount of friction in the moving parts, and in sawing up a slab, or other piece of material, placed on the bed with its one edge resting against the gage (b) and its one end against the back stop piece (a), the sawing is accomplished by merely moving the bed on its hinged bearings as described, which will force the work up to the saw and the saw against and through the stuff, without the operator running along with the work or shifting his position at all, and as the material being cut has no separate motion of its own on the table, its friction thereon is avoided and a large slab designed to be cut up into strips or laths may consequently be at once so cut up without dividing it into bolts; thus are time and labor economized; the simple and easy act of swinging backward and forward the bed by the operator, his hand if requisite merely resting upon the stuff to steady it, effects the cut and runs back the work for a new cut if such be required, without change of his position and requiring but a slow and short feed, the saw moving one half and the stuff one half which reduces the movement of the operator's hand one half and enables him to cut a long piece of stuff without shifting his position.

Of course the construction of parts may be modified to suit the work to be done. A positive reciprocating motion may be given to the bed, or if the two are geared together as described, to the radius arm (e) of the saw, by gear from the power which drives the saw, instead of working the bed backward and forward by hand. The position of its operation may also be varied, as for instance the machine may be attached to the side of a building and be driven by a vertical driving shaft, the radius arms or pieces that carry the saw and bed being arranged horizontally; or the radius arms may be suspended from a horizontal shaft overhead. Such and other changes however which do not depart from the character of my improvement it is unnecessary to particularize.

What I claim as new and useful herein, and desire to secure by Letters Patent, is—

1. Giving to the revolving saw (B) a reciprocating action across or along the bed, in combination with the reciprocating movement of the bed or table (A) simultaneously in an opposite direction.

2. Hanging or supporting the revolving saw (B) and bed or table (A), to give them their specified compound parallel or otherwise equivalently reciprocating movement simultaneously in opposite directions, on or to radial arms (c and e) arranged substantially as set forth and geared together by toothed segments (l) or otherwise equivalently connected or driven to produce the necessary contra joint action of said radial arm, essentially as described, and whereby the proper reciprocating actions of the saw and bed relatively to each other are insured and the movement of the one may be made to actuate the other as specified.

In testimony whereof, I have hereunto subscribed my name.

THOS. J. ALEXANDER.

Witnesses:
 THOS. JONES,
 JAMES WESTERVELT.